United States Patent Office 2,952,654
Patented Sept. 13, 1960

2,952,654
VINYL CHLORIDE POLYMER PLASTICIZED WITH N,N,N′,N′ TETRAALKYLPHTHALAMIDE AND PROCESS OF MAKING

Chester E. Adams, Highland, and Joseph Paul O'Brien, Whiting, Ind., assignors to Standard Oil Company, Chicago, Ill., a corporation of Indiana No Drawing. Filed Dec. 23, 1957, Ser. No. 704,311

5 Claims. (Cl. 260—32.6)

This invention relates to novel compositions comprising organic thermoplastic materials and plasticizers therefor. More particularly, the invention relates to plasticized compositions comprising polymers of vinyl chloride and co-polymers thereof containing a predominant amount of polyvinyl chloride.

A large number of plasticizers have been proposed for incorporation into compositions comprising organic thermoplastic materials such as vinyl chloride polymers and co-polymers. For example various neutral esters of phthalic acid, phosphoric acid, adipic acid, sebacic acid and the like have been employed for this purpose. The choice of plasticizer is dictated primarily by the particular thermoplastic resin which is to be plasticized and the particular use to which the resultant composition is to be put. Where a single plasticizer component is deficient in imparting one or more desirable properties to the plasticized resin composition, mixtures of plasticizers have been employed.

Among the properties generally desired of a plasticized resin composition, retention of the plasticizer under a variety of conditions is essential in order to avoid changes in physical properties such as softness, flexibility, etc. of the composition on aging. Where the resin composition is employed in contact with substances capable of removing the plasticizer component, such as solid surfaces having an affinity for plasticizer (for example, lacquered surfaces) or where the composition is subjected to washing or repeated contact with oily surfaces (for example, as upholstering material) the property of permanence is of extreme importance to preserve the flexibility and other desirable properties of the plasticized composition.

An object of this invention is to provide new compositions of matter comprising organic thermoplastic resins and plasticizers therefor. Another object is to provide such plasticized compositions comprising polymers of vinyl chloride and co-polymers thereof. A further object is to provide a new type of plasticizer for compounding with thermoplastic resins, particularly vinyl chloride resins, which imparts improved low volatility characteristics and improved permanence and retention of physical properties. These and other objects of our invention will be apparent from the ensuing description thereof.

According to the present invention, these objects are accomplished by a composition comprising a thermoplastic material and a plasticizer comprising an N,N,N′,N′-tetraalkylphthalamide having the general structural formula

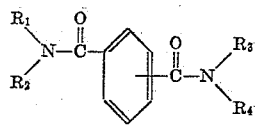

wherein R represents an alkyl group having from 1 to 10 carbon atoms. While the alkyl groups in the plasticizer need not be the same, it will be appreciated that for economic considerations and ease of preparation of the plasticizer, the alkyl groups are preferably the same or alternatively, the two groups

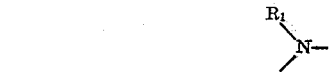

and

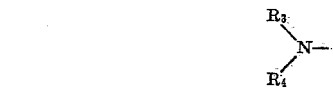

may be identical and derived from the same amine having alkyl groups $R_1$ and $R_2$ which differ in chain length as further described hereinafter.

As has been represented by the structural formula of the new plasticizers employed in the present invention, the position of one amide group is denoted as fixed on the benzene ring and the position of the other amide group is indicated as variable. By this notation is meant that the N,N,N′,N′-tetraalkylphthalamide plasticizer can be a derivative of any one of the three isomeric phthalic acids. Thus, the phthalic acid may comprise a member of the group consisting of ortho-pthalic acid, iso-phthalic acid and terephthalic acid. The expressions "phthalic acid" and "tetraalkylphthalamide" will be used throughout the specification in their broad sense to mean any of the isomeric benzene dicarboxylic acids or di-amide derivatives thereof. Mixtures of these acids may be employed.

The plasticizers of the present invention are readily prepared from commercially available raw materials by methods well known in the art. For example phthalic acid can be converted to phthaloyl dichloride in known manner by reaction with thionyl chloride and this compound further reacted with a stoichiometric amount of a dialkylamine. This so-called Schotten-Baumann reaction can be conducted in aqueous solution, for example as described in United States Patent 2,137,279 of Felix Haffner et al., to obtain high yields of the desired tetra-alkylphthalamide. Alternately, the phthalic acid may be converted to a di-salt of an alkali metal such as the di-sodium salt and reacted with an acid salt of a dialkyl-amine, for example with the phosphoric acid salt to yield the desired products. Other methods for the preparation of N,N,N′,N′-tetraalkylphthalamides will be apparent to those skilled in the art and will not be further described, the preparation of the plasticizer component of the novel compositions described herein not being a part of the present invention.

The dialkylamine which is employed for the preparation of the desired tetraalkylphthalamide plasticizers suitably contains from 1 to 10 carbon atoms per alkyl group and preferably from 2 to 6 carbon atoms per alkyl group. Such alkyl groups may be straight chain or branch chain and may be the same or different. Suitable dialkyl-amine reactants include for example dimethylamine, di-ethylamine, methylethylamine, di-n-butylamine, di-iso-butylamine, di-octylamine, didecylamine and the like. We prefer to employ di-n-butylamine since the tetrabutyl-phthalamide compound prepared therefrom has a particularly useful combination of compatibility with vinyl chloride resins and low volatility.

The organic thermoplastic resins with which the tetra-alkyl phthalamides can be used as plasticizers may consist of one or more natural or synthetic resins including for example cellulose derivatives such as cellulose nitrate, cellulose acetate, cellulose acetobutyrate, ethyl cellulose, benzyl cellulose and the like, polymers and interpolymers of compounds containing a vinylidene group ($CH_2=C<$) such as vinyl chloride, vinyl acetate, vinylidene chloride and acrylic acid derivatives such as methyl methacrylate and acrylonitrile, halogenated solid polymers of ethylene, synthetic rubbers such as homo-polymers of butadiene and co-polymers thereof with styrene and/or acrylonitrile and the like. The tetraalkylphthalamides are particularly valuable as plasticizers for polyvinyl chloride and co-polymers thereof containing more than 70% vinyl chloride and up to 30% of other polymerizable monomers copolymerizable therewith, for example, vinylacetate and other vinyl esters of monocarboxylic acids, esters of maleic and fumaric acid such as ethylmaleate and ethylfumarate and the like.

The compositions of this invention may be in the form of solid molding materials, pastes, lacquers, solutions or dispersions. In the preparation of compositions comprising plasticized vinyl chloride resins, the plasticizer may be blended with the resin in conventional manner, for example by mixing and heating on a roll mill, Banbury type mixers or other suitable mixing devices, at a temperature from about 250° F. to about 325° F., preferably about 300° F. The relative amounts of the thermoplastic material and the plasticizer may be varied over wide limits according to the particular properties required. Amounts similar to those conventionally used with other plasticizers are employed, the proportions of plasticizer being usually in the range of from about 10% to about 75% by weight of the plasticized composition. Generally compositions containing from about 30 to about 60 parts of plasticizer per 100 parts of resin have been found to have highly desirable properties. Such a quantity of plasticizer will generally remain as a permanent part of the vinyl resin and the composition so prepared will not deteriorate or become embrittled by reason of loss of plasticizer during use.

The N,N,N',N'-tetraalkylphthalamide plasticizers of the present invention may be employed as the sole plasticizer in resin compositions or may be used in admixture with other known plasticizers or softening agents. For example, known plasticizers such as dibutylphthalate, di-2-ethylhexylphthalate, diisooctylphthalate, and the like and similar esters of, for example, adipic acid, phosphoric acid, sebacic acid, etc. may replace a portion of the tetraalkylphthalamide plasticizer, the total amount of plasticizer employed being within the range previously indicated. Secondary plasticizers or extenders having lesser compatibility with vinyl resins, for example butyl stearate, high boiling hydrocarbon oils, chlorinated paraffin waxes and the like may be advantageously employed in admixture with the plasticizer of the present invention to obtain compositions having particular desirable physical properties.

In addition to the thermoplastic resin and plasticizer, other ingredients may be present in the compositions of the present invention, for example stabilizers, fillers, coloring materials and the like which are conventionally employed in preparing plasticized resin compositions for particular applications.

Compositions of the present invention are suitable for applications usual for previously known thermoplastic resin compositions including for example molding, extrusion and coating application. Plastisols, that is, dispersions of finely divided polyvinyl chloride polymers or co-polymers in the plasticizer may be prepared and used in known manner for the production of hollow articles, film, coatings, and the like.

The following example illustrates in detail the practice of the present invention.

EXAMPLE (A) *Preparation of N,N,N',N'-tetrabutylisophthalamide*

Isophthalic acid (249 g.) was reacted with a 4:1 molar excess of thionyl chloride and a catalytic amount of pyridine (5.0 g.) at reflux temperature for five hours. The excess unreacted thionyl chloride was removed under reduced pressure, and the product distilled under vacuum. A 90% yield of the crystalline phthaloyl dichloride was obtained.

The acid chloride (50.7 gm.) was dissolved in 500 ml. of benzene and added with cooling to 160 gm. (1.25 mol) of di-n-butylamine. The mixture was then heated at reflux temperature for one hour. The reaction mixture was then cooled, 100 ml. of water added, and the benzene layer separated and washed five times with 100 ml. portions of water. The benzene solvent and traces of di-butylamine were removed by distillation and the residual product distilled under vacuum. An 86% yield of N,N,N',N'-tetrabutylphthalamide was obtained having a boiling point of 248° C. at 7 mm. Hg pressure, nitrogen content of 7.01% and a molecular weight (Menzies-Wright Method) of 383 (theory 388). The distilled product was employed without further purification in the preparation of the following resin compositions.

(B) *Preparation of plasticized resin composition*

Resin compositions were prepared by blending specified amounts of the indicated plasticizer with the following ingredients:

| | Parts |
|---|---|
| Polyvinyl chloride resin | 100 |
| Basic lead carbonate | 3 |
| Stearic acid | 0.5 |

The blends were then milled on a steam-heated two-roll mill at about 300° F. temperature until uniform, fused sheets were obtained. These sheets, approximately 0.08 inch thick, where then compression molded at 165° C. and 1100 p.s.i. to give sheets 6 x 6 x 0.075 inch in size. The compression molding cycle included a preheat period of six minutes, three minutes of heating under pressure, and a period of rapid cooling under pressure. Uniform well-molded sheets were thus obtained for testing.

(C) *Physical properties of plasticized resin composition*

Polyvinyl chloride resin compositions compounded as described in B were prepared employing N,N,N',N'-tetrabutylisophthalate and compared with similarly prepared compositions in which diisooctylphthalate was employed as the plasticizer. In order to obtain comparative data, compositions in each case were prepared so as to have a modulus of 1600 p.s.i. at 100% elongation. The amount of plasticizer required to prepare a compound having this modulus is recorded in the following table as the "Equivalent Modulus Concentration" and gives an indication of the efficiency of the plasticizer in the resin composition.

| | Di-isooctylphthalate | N,N'-Tetrabutylisophthalamide |
|---|---|---|
| Equivalent Modulus Concentration (Parts Plasticizer per 100 parts resin) | 51.4 | 54.5 |
| Modulus, 100% Elongation, p.s.i. | 1,600 | 1,600 |
| Ultimate, Elongation, percent | 375 | 360 |
| Ultimate Tensile Strength, p.s.i. | 2,865 | 2,648 |
| Permanence Characteristics: | | |
| Migration Loss,[1] wt. percent | 5.02 | 0.5 |
| Volatile Loss,[2] wt. percent | 0.69 | 0.06 |
| Mineral Oil Extraction,[3] wt. percent | 3.67 | 0.43 |

[1] 100 mesh silica, 5-lb. load, 24 hours at 60° C.
[2] Columbia 6–14 mesh carbon, 24 hours at 70° C., ASTM D1203–52T.
[3] Mineral oil, 24 hours at 50° C., ASTM D1239–52T.

As will be apparent from the table the efficiency of N,N,N',N'-tetrabutylisophthalamide as a plasticizer differs only slightly from that of the widely used plasticizer, di-isooctylphthalate. Despite the fact that slightly more of the tetraalkylphthalamide plasticizer was employed in the composition tested, it will be noted that the permanence characteristics of the plasticizer are far superior to that of diisooctylphthalate, being in each test only about one-tenth as great as the value obtained for di-isooctylphthalate.

Compositions containing 60 parts of N,N,N',N'-tetrabutylisophthalamide per 100 parts of resin exhibit similar excellent physical properties and permanence characteristics.

Similar plastic compositions exhibiting good flexibility and excellent permanentce as evidenced by low volatility and low extractability of the plasticizer are obtained when using from 30 to 60 parts of the following compounds per hundred parts of resin to polyvinyl chloride resin compositions.

N,N,N′,N′-tetrabutylorthophthalamide
N,N,N′,N′-tetrabutylterephthalamide
N,N,N′,N′-tetraethylisophthalamide
N,N,N′,N′-tetraethylterephthalamide Although the invention has been described with respect to specific embodiments, it is not intended that the details thereof shall be construed as limitations upon the scope of the invention except to the extent incorporated in the following claims.

We claim:

1. A vinyl resin composition which comprises a vinyl chloride polymer selected from the group consisting of polyvinyl chloride and copolymers of at least 70% vinyl chloride with up to 30% of other monomer containing a vinylidene group copolymerizable therewith in the polymer molecule, plasticized with from about 10% to about 75% by weight of said composition of an N,N,N′,N′-tetraalkylphthalamide having from 1 to 10 carbon atoms in each of the alkyl groups.

2. The composition of claim 1 wherein said phthalamide is an N,N,N′,N′-tetraalkylphthalamide of a phthalic acid selected from the group consisting of orthophthalic acid, isophthalic acid and terephthalic acid.

3. A vinyl resin composition which comprises a vinyl chloride polymer selected from the group consisting of polyvinyl chloride and copolymers of at least 70% vinyl chloride with up to 30% of other monomer containing a vinylidene group copolymerizable therewith in the polymer molecule, plasticized with from about 10 to about 75% by weight of N,N,N′,N′-tetrabutylisophthalamide.

4. The process which comprises the steps of admixing a vinyl chloride polymer selected from the group consisting of polyvinyl chloride and copolymers of at least 70% vinyl chloride with up to 30% of other monomer containing a vinylidene group copolymerizable therewith in the polymer molecule and from about 10 to about 75% by weight of the mixture of a plasticizer comprising an N,N,N′,N′-tetraalkylphthalamide having from 1 to 10 carbon atoms per alkyl group and heating said mixture to obtain a uniform fused product.

5. The process of claim 4 wherein N,N,N′,N′-tetrabutylisophthalamide is employed as the plasticizer.

References Cited in the file of this patent

UNITED STATES PATENTS

| | | |
|---|---|---|
| 2,824,016 | Cornwell | Feb. 18, 1958 |
| 2,843,558 | Fujisaki et al. | July 15, 1958 |